United States Patent
Han et al.

(10) Patent No.: US 11,849,410 B2
(45) Date of Patent: Dec. 19, 2023

(54) ANTENNA SYSTEM AND ELECTRONIC DEVICE THEREOF WHICH DYNAMICALLY ADJUST OUTPUT POWER OF AN ANTENNA

(71) Applicant: ASUSTeK COMPUTER INC., Taipei (TW)

(72) Inventors: Zhao-Wei Han, Taipei (TW); Yu-Shen Mai, Taipei (TW); Zi-Ji Huang, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 295 days.

(21) Appl. No.: 17/123,463

(22) Filed: Dec. 16, 2020

(65) Prior Publication Data

US 2021/0212000 A1 Jul. 8, 2021

(30) Foreign Application Priority Data

Jan. 2, 2020 (TW) ................. 109100114

(51) Int. Cl.
*H04W 52/38* (2009.01)
*G01D 5/24* (2006.01)
(Continued)

(52) U.S. Cl.
CPC .............. *H04W 52/38* (2013.01); *G01B 7/14* (2013.01); *G01D 5/24* (2013.01)

(58) Field of Classification Search
CPC ............ H01Q 1/243; H01Q 1/38; H01Q 7/00; H01Q 9/42; H01Q 1/245; H01Q 1/44; H01Q 5/328; H01Q 5/335; H01Q 1/42; H01Q 1/48; H01Q 21/28; H01Q 1/526; H01Q 9/0421; H01Q 5/35; H01Q 1/24; H01Q 9/0442; H01Q 21/065; H01Q 1/521; H01Q 1/52; H01Q 5/50; H01Q 9/045; H01Q 5/371; H01Q 9/0457; H05K 2201/10098; H05K 1/181; H05K 1/147; H05K 1/148; H05K 1/0216; H05K 1/028; H05K 3/361; H05K 3/366; H05K 3/40;
(Continued)

(56) References Cited

U.S. PATENT DOCUMENTS

| 9,258,026 | B2 | 2/2016 | Chang et al. |
| 9,374,119 | B1 | 6/2016 | Chou et al. |

(Continued)

FOREIGN PATENT DOCUMENTS

| CN | 103179653 B | 6/2013 |
| CN | 104122974 A | 10/2014 |

(Continued)

*Primary Examiner* — Golam Sorowar
(74) *Attorney, Agent, or Firm* — McClure, Qualey & Rodack, LLP

(57) ABSTRACT

An antenna system and an electronic device are provided. The antenna system includes an antenna, a sensor, and a wireless radio frequency module. The sensor is electrically connected to the processor. The wireless radio frequency module is electrically connected to the antenna and the processor. The sensor generates and transmits a sensing signal to the processor according to a change of a proximity distance between an object and the antenna. The processor dynamically adjusts an output power of the wireless radio frequency module according to a sensing signal.

10 Claims, 10 Drawing Sheets

(51) Int. Cl.
*G01B 7/04* (2006.01)
*G01B 7/14* (2006.01)

(58) Field of Classification Search
CPC .. H05K 5/0247; H05K 9/0022; H05K 9/0075; H05K 9/0081; H05K 9/0084; H05K 1/0298; H05K 1/0236; H05K 1/0271; H05K 1/115; H05K 1/0243; H05K 1/0215; H05K 1/0231; H05K 1/0233; H04B 1/04; H04B 1/3838; H04B 5/0037; H04B 5/0081; H04B 5/0031; H04B 5/0075; H04B 1/0458; H04B 1/16; H04B 1/40; H04B 5/005; H04B 1/18; H04B 1/006; H04B 1/0064; H04B 1/44; H04B 1/0057; H04B 1/401; H04B 17/103; H04B 17/13; H04B 1/0053; H04B 1/3827; H04B 15/00; H04B 2001/0408; H04B 1/0475

See application file for complete search history.

(56) References Cited

U.S. PATENT DOCUMENTS

| | | | |
|---|---|---|---|
| 2011/0012793 A1* | 1/2011 | Amm | H01Q 1/44 343/702 |
| 2014/0002305 A1* | 1/2014 | Hsu | H01Q 1/52 342/368 |
| 2016/0270001 A1 | 9/2016 | Yanbo et al. | |
| 2016/0345275 A1 | 11/2016 | Zhang et al. | |
| 2018/0107849 A1* | 4/2018 | Park | H04W 4/80 |
| 2020/0194928 A1* | 6/2020 | Yeo | H01Q 1/245 |

FOREIGN PATENT DOCUMENTS

| | | |
|---|---|---|
| CN | 105939417 A | 9/2016 |
| CN | 107548145 A | 1/2018 |
| TW | 201633606 A | 9/2016 |

* cited by examiner

ANTENNA SYSTEM AND ELECTRONIC DEVICE THEREOF WHICH DYNAMICALLY ADJUST OUTPUT POWER OF AN ANTENNA

CROSS-REFERENCE TO RELATED APPLICATION

This application claims the priority benefit of Taiwan application serial No. 109100114, filed on Jan. 2, 2020. The entirety of the above-mentioned patent application is hereby incorporated by reference herein and made a part of specification.

BACKGROUND OF THE INVENTION

Field of the Invention

The disclosure relates to an antenna system and electronic device thereof which dynamically adjust output power of an antenna.

Description of the Related Art

Specific absorption rate (SAR) is an important indicator to measure a radiation effect of the wireless device on a human body. To avoid the effect of electromagnetic waves on a human body, the SAR safety specification is established, such as 1.6 W/kg defined by Federal Communications Commission (FCC) and 2.0 W/kg defined by Communate Europpene (CE). Then, the maximum SAR value of the wireless device permitted for the human body is defined.

Due to the requirement of a narrow bezel screen, an antenna is usually configured at a side of a casing of a Wi-Fi notebook. Consequently, when the antenna is close to the human body, the output power of the Wi-Fi wireless device is adjusted lower to conform to the safety specification. However, when the output power of the Wi-Fi wireless device is adjusted lower, the Wi-Fi connection quality is reduced, and the efficiency of the wireless network is affected.

BRIEF SUMMARY OF THE INVENTION

According to the first aspect, an electronic device is provided. The electronic device comprises: an antenna; a system circuit board, a conducting circuit is disposed on the system circuit board, and the conducting circuit is electrically connected to the antenna; a sensor disposed on the system circuit board and electrically connected to the conducting circuit; a wireless radio frequency module disposed on the system circuit board and connected to the antenna via the conducting circuit; and a processor disposed on the system circuit board and electrically connected to the sensor and the wireless radio frequency module, wherein the sensor generates and transmits a sensing signal to the processor according to a change of a proximity distance between an object and the antenna, the processor dynamically adjusts an output power of the wireless radio frequency module according to a sensing signal.

According to the first aspect, an antenna system electrically connected to a processor is provided. The antenna system comprises: an antenna; a sensor, electrically connected to the antenna, the sensor is electrically connected to the processor; and a wireless radio frequency module electrically connected to the antenna and the processor; wherein the sensor generates and transmits a sensing signal to the processor according to a change of a proximity distance between an object and the antenna, the processor dynamically adjusts an output power of the wireless radio frequency module according to a sensing signal.

In sum, with a sensor and an antenna in this disclosure, the output power of the wireless radio frequency module is dynamically adjusted to improve the network performance.

These and other features, aspects and advantages of the present invention will become better understood with regard to the following description, appended claims, and accompanying drawings.

DETAILED DESCRIPTION OF THE EMBODIMENTS

Figure 1:
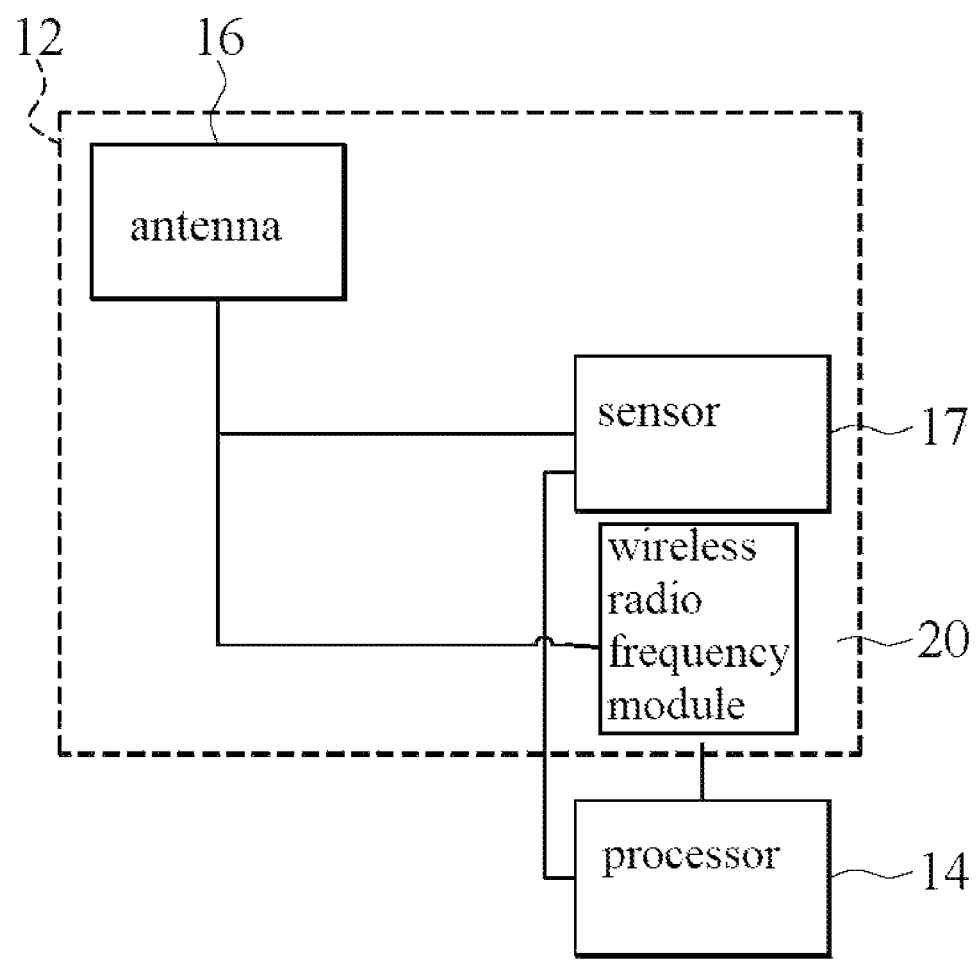
FIG. 1 is a block diagram showing an antenna system according to an embodiment.

FIG. 1 is a block diagram showing an antenna system according to an embodiment. An antenna system 12 is electrically connected to a processor 14. The antenna system 12 includes at least an antenna 16, a sensor 17, and a wireless radio frequency module 20. The antenna 16 is a dipole antenna, a coupled antenna, or an antenna body unconnected to the system ground. The sensor 17 is electrically connected to a corresponding antenna 16. The sensor 17 is electrically connected to the processor 14. The wireless radio frequency module 20 is electrically connected to the antenna 16 and the processor 14.

In an embodiment, the sensor 17 and the wireless radio frequency module 20 of the antenna system 12 are disposed on a system circuit board 24 of the electronic device 10.

Figure 2:
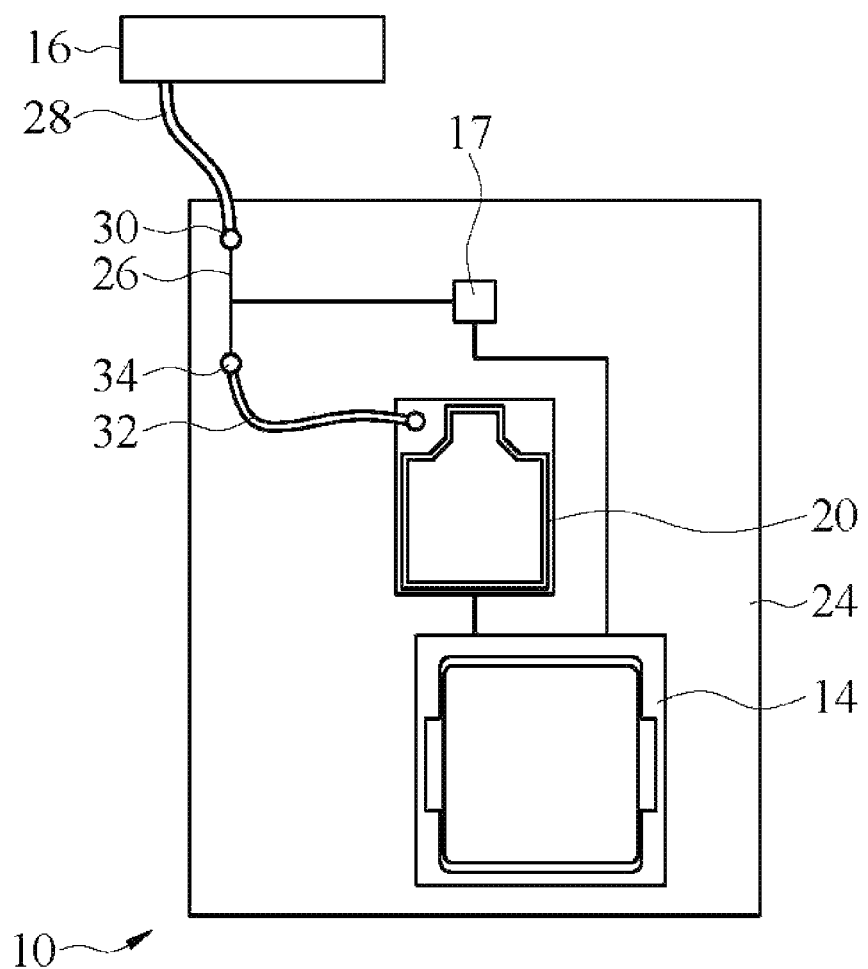
FIG. 2 is a schematic diagram showing an electronic device according to an embodiment.

Please refer to FIG. 1 and FIG. 2, the electronic device 10 includes the antenna system 12, the system circuit board 24 and the processor 14. In an embodiment, the electronic device 10 includes a conducting circuit 26 disposed on the system circuit board 24. The conducting circuit 26 is electrically connected to the antenna 16. In the embodiment, the number of the antenna 16 is one. A conducting circuit 26 is disposed on the system circuit board 24 correspondingly. The antenna 16 is electrically connected to the conducting circuit 26 via a coaxial cable 28 and a high-frequency connector 30. The sensor 17 is disposed on the system circuit board 24 and electrically connected to the conducting circuit 26. The wireless radio frequency module 20 is disposed on the system circuit board 24 and connected to the antenna 16 via the conducting circuit 26. In an embodiment, the wireless radio frequency module 20 is electrically connected to the conducting circuit 26 via a coaxial cable 32 and a high-frequency connector 34. Then, the wireless radio frequency module 20 is connected to the antenna 16 via the coaxial cable 32, the high-frequency connector 34, the conducting circuit 26, the high-frequency connector 30, and the coaxial cable 28 in sequence. As a result, the wireless radio frequency module 20 transmits and receives radio-frequency signals via the antenna 16. The processor 14 is disposed on the system circuit board 24 and electrically connected to the sensor 17 and the wireless radio frequency module 20. The sensor 17 generates and transmits a sensing signal to the processor 14 according to a change of a proximity distance between an object and the antenna 16. The processor 14 dynamically adjusts an output power of the wireless radio frequency module 20 according to a sensing signal of the sensor 17. In the embodiment, since the sensor 17, the wireless radio frequency module 20, and the processor 14 are disposed on a same system circuit board 24 of the electronic device 10, no additional circuit board is needed. As a result, the circuit needs less space and has lower complexity.

Figure 3:
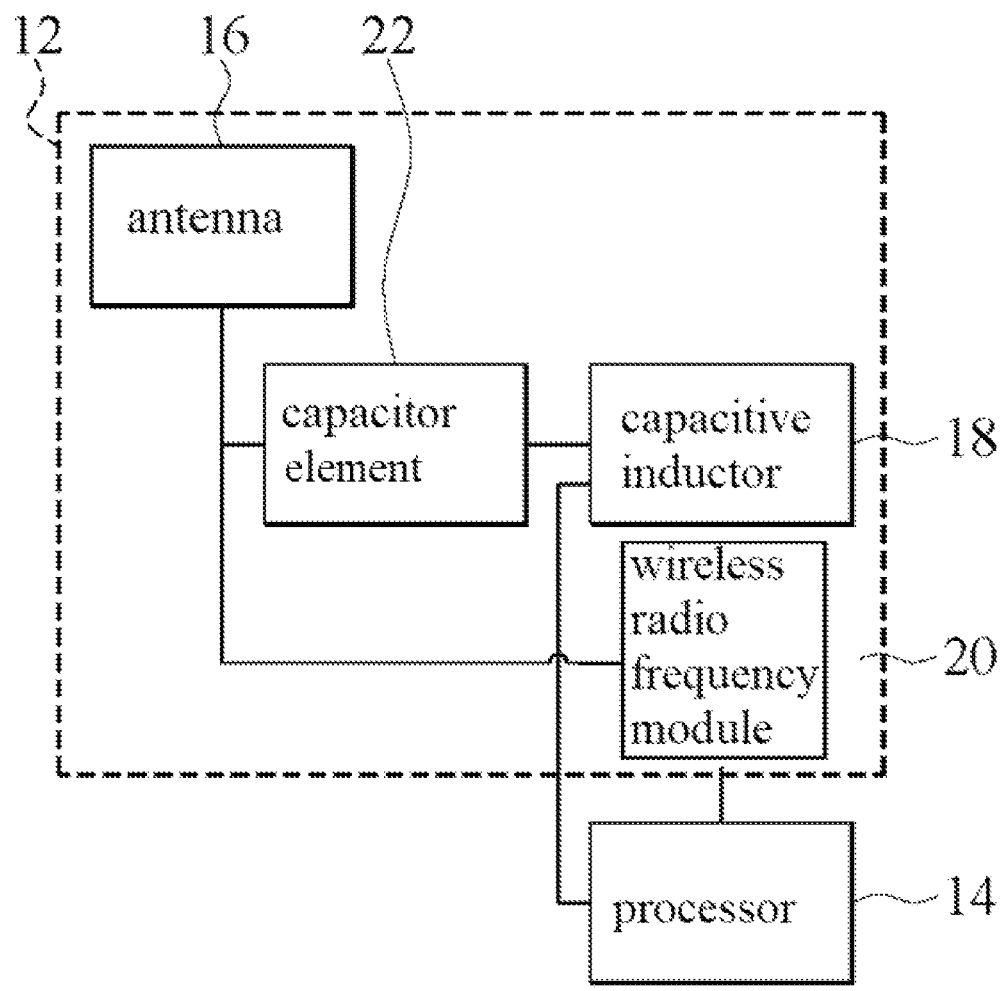
FIG. 3 is a block diagram showing an antenna system according to an embodiment.
Figure 4:
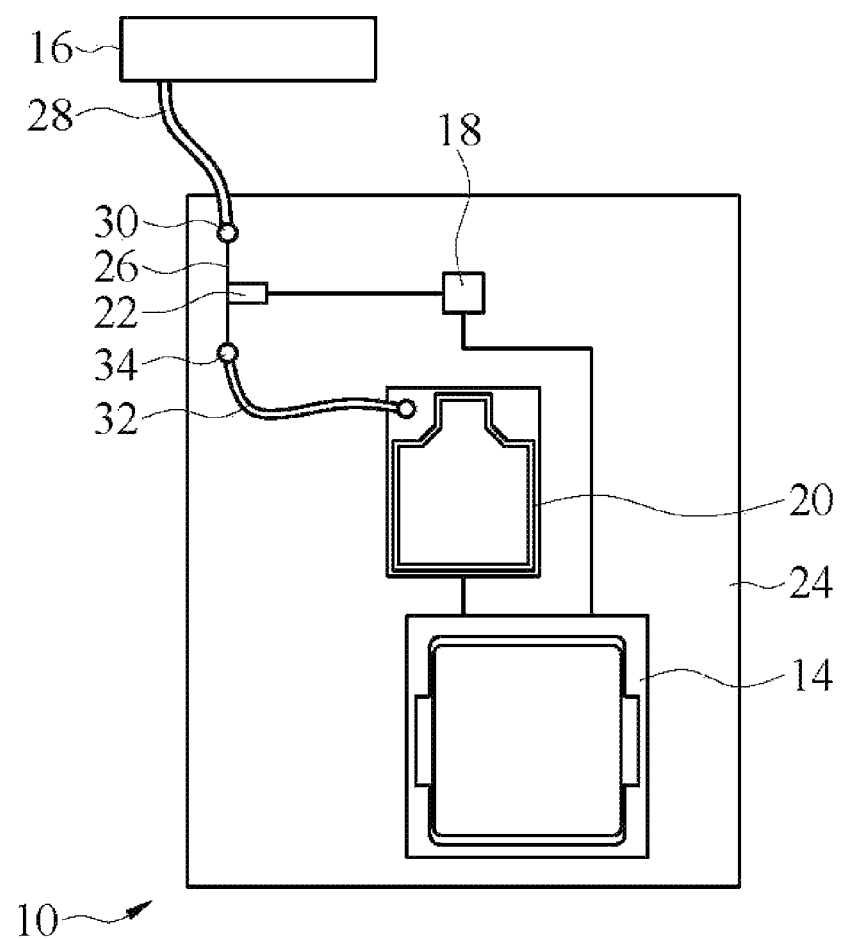
FIG. 4 is a schematic diagram showing an electronic device according to an embodiment.

FIG. 3 is a block diagram showing an antenna system according to an embodiment. FIG. 4 is a schematic diagram showing an electronic device according to an embodiment. In the embodiment, the sensor of the antenna system 12 is a capacitive inductor 18. The capacitive inductor 18 is electrically connected to the corresponding antenna 16 via at least a capacitor element 22. The antenna signal is distributed to the capacitive inductor 18 via the capacitor element 22. The capacitive inductor 18 is electrically connected to the processor. The capacitive inductor 18, the capacitor element 22, the wireless radio frequency module 20, and the processor 14 of the antenna system 12 are disposed on the system circuit board 24 of the electronic device 10. The capacitive inductor 18 is disposed on the system circuit board 24 and is electrically connected to the conducting circuit 26 via the capacitor element 22. The processor 14 is disposed on the system circuit board 24 and electrically connected to the capacitive inductor 18 and the wireless radio frequency module 20. The capacitive inductor 18 generates and transmits the sensing signal according to the change of the capacitance of the capacitor element 22. Then, the processor 14 controls the output power of the wireless radio frequency module 20 according to the sensing signal of the capacitive inductor 18.

In an embodiment, the antenna system 12 of the electronic device 10 includes two antennas 16 and 16'. Please refer to FIG. 5 and FIG. 6, two conducting circuits 26 and 26' are disposed on the system circuit board 24. The conducting circuits 26 and 26' are electrically connected to the antennas 16 and 16', respectively. That is, the antenna 16 is electrically connected to the conducting circuit 26 via the coaxial cable 28 and the high-frequency connector 30. The antenna 16' is electrically connected to the conducting circuit 26' via the coaxial cable 28' and the high-frequency connector 30'. The shared capacitive inductor 18 is electrically connected to the conducting circuits 26 and 26' via the capacitor elements 22 and 22', respectively, and then connected to the corresponding antennas 16 and 16', respectively. The wireless radio frequency module 20 is electrically connected to the conducting circuit 26 via the coaxial cable 32 and the high-frequency connector 34. The wireless radio frequency module 20 is electrically connected to the conducting circuit 26' via the coaxial cable 32' and the high-frequency connector 34'. Thus, the wireless radio frequency module 20 is connected to the antenna 16 via the coaxial cable 32, the high-frequency connector 34, the conducting circuit 26, the high-frequency connector 30, and the coaxial cable 28 in sequence. The wireless radio frequency module 20 is connected to the antennas 16 and 16' via the coaxial cable 32', the high-frequency connector 34', the conducting circuit 26', the high-frequency connector 30', and the coaxial cable 28' in sequence. The processor 14 is electrically connected to the capacitive inductor 18 and the wireless radio frequency module 20.

In an embodiment, the electronic device 10 is a notebook, a tablet computer, a desktop computer, which is not limited herein.

Figure 7:
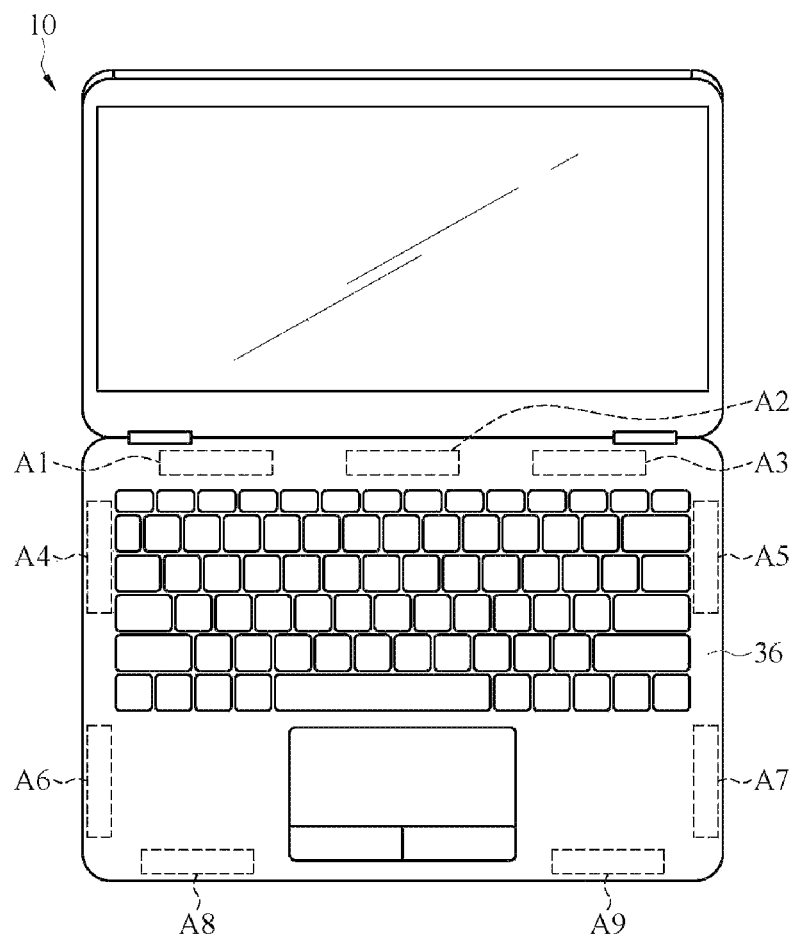
FIG. 7 is a schematic diagram showing an appearance of an electronic device according to an embodiment.

FIG. 7 is a schematic diagram showing an appearance of an electronic device according to an embodiment. Please refer to FIG. 1 and FIG. 7. In the embodiment, the electronic device 10 is a notebook, which is not limited herein. The electronic device 10 further includes a casing 36 to accommodate the system circuit board 24 and components. In embodiments, the antennas 16 and 16' are disposed at inner sides of the casing 36. As shown in FIG. 7, installation positions A1 to A9 are provided for disposing the antennas 16 and 16' in embodiments. Any number of antennas, such as the single antenna 16 in FIG. 1, the double antennas 16 and 16' in FIG. 3, is adapted to be disposed at any position of the installation positions A1 to A9. The number of antennas and the installation positions A1 to A9 are selected according to the circuit layout of the electronic device 10, which is not limited herein.

Figure 5:
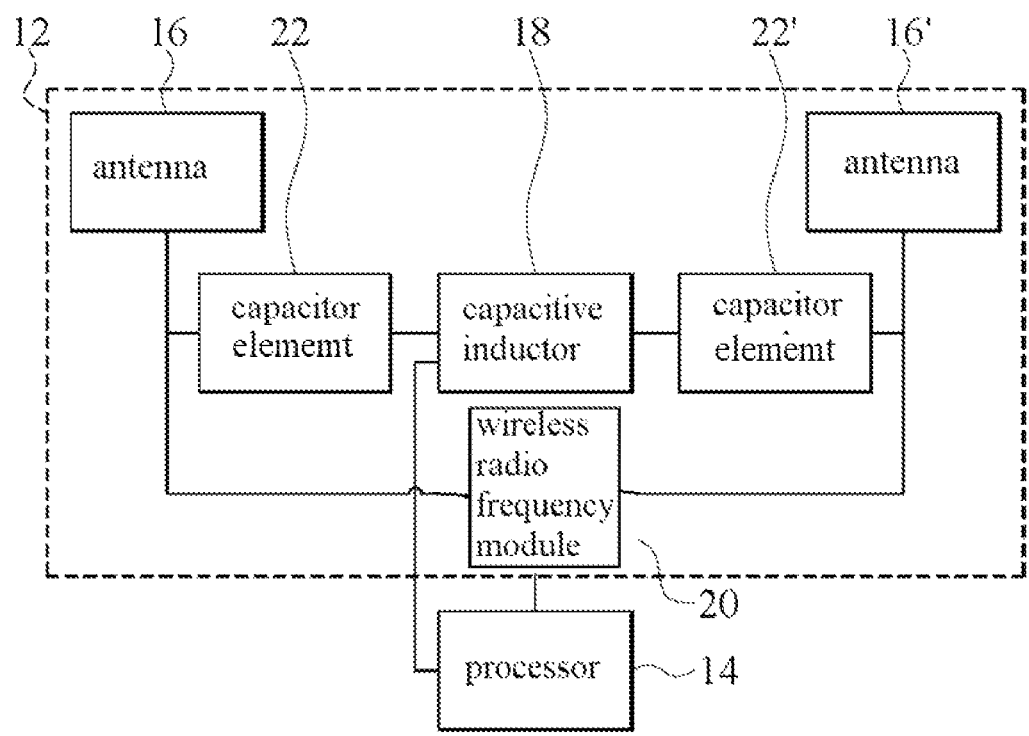
FIG. 5 is a block diagram showing an antenna system according to an embodiment.
Figure 6:
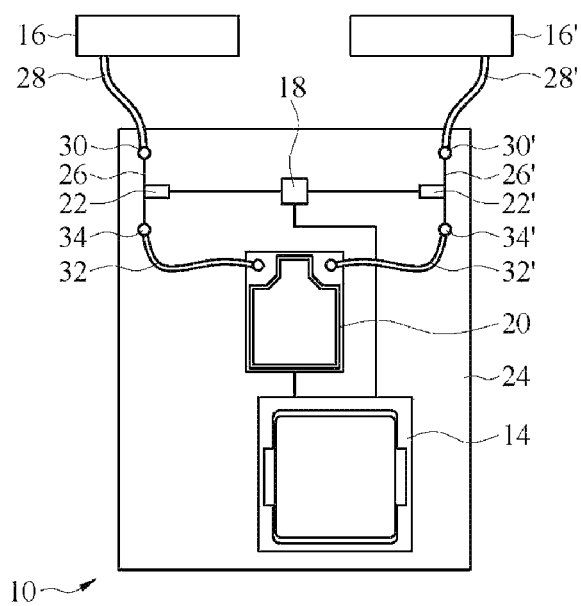
FIG. 6 is a schematic diagram showing an electronic device according to an embodiment.

The antenna system 12 in FIG. 5 and the electronic device 10 in FIG. 6 are taken as an example. Please refer to FIG. 5 and FIG. 6, when the wireless radio frequency module 20 of the electronic device 10 is connected to network via Industrial Scientific Medical Band (ISM), the antennas 16 and 16' of the electronic device 10 operate in a normal state. When no object (a human body) is close to the antennas 16 and 16', the output power of the wireless radio frequency module 20 keeps high, and thus the antennas 16 and 16' have a good transmitting and receiving effect. When the object (the human body) is gradually close to any one of the antennas 16 and 16', the proximity distance between the object and the antennas 16 and 16' changes, and the capacitance of the capacitor elements 22 and 22' also changes. Then, the capacitive inductor 18 generates a sensing signal to the processor 14 according to the change of the capacitance. In an embodiment, an induction comparison table is built in the processor 14, the processor 14 looks up the induction comparison table to find the power setting parameter from the induction comparison table according to the inductance value. The processor 14 outputs the power setting parameter to the wireless radio frequency module 20.

The output power of the wireless radio frequency module 20 is dynamically adjusted according to the power setting parameter.

Figure 8:
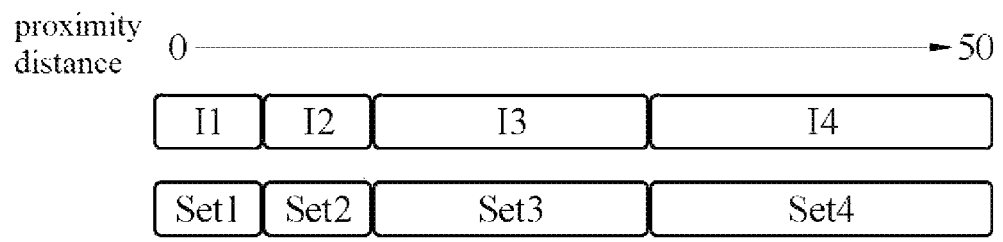
FIG. 8 is a schematic diagram showing an induction comparison table of an electronic device according to an embodiment.

When the proximity distances between the object and the antennas 16 and 16' are different, the capacitances of the capacitive inductor 18 are different. In an embodiment, two or more groups of power setting parameters are set corresponding to the output power of the wireless radio frequency module 20. The power setting parameters respectively correspond to the inductance value range of the capacitive inductor 18 at different proximity distances. FIG. 8 is a schematic diagram showing an induction comparison table of an electronic device according to an embodiment. Please refer to FIG. 5 to FIG. 8, the induction comparison table includes two inductance value ranges and power setting parameters corresponding to the two inductance value ranges. In the embodiment, the inductance value ranges includes four ranges I1 to I4, which is not limited herein. In an embodiment, there are four inductance value ranges I1 to I4 corresponding to different proximity distances, and the four inductance value ranges I1 to I4 are not equal. Each of the ranges I1 to I4 corresponds to one of the power setting parameters Set1 to Set4. The wireless radio frequency module 20 has different output power at different power setting parameters Set1 to Set4. When the power setting parameter Set1, Set2, Set3, or Set4 in the induction comparison table is found via the processor 14 and transmitted to the wireless radio frequency module 20. When the wireless radio frequency module 20 receives the received power setting parameter Set1, Set2, Set3, or Set4, the wireless radio frequency module 20 generates the output power corresponding to the received power setting parameter Set1, Set2, Set3, or Set4, and the output power of the antennas 16 and 16' is adjusted correspondingly.

Figure 9:
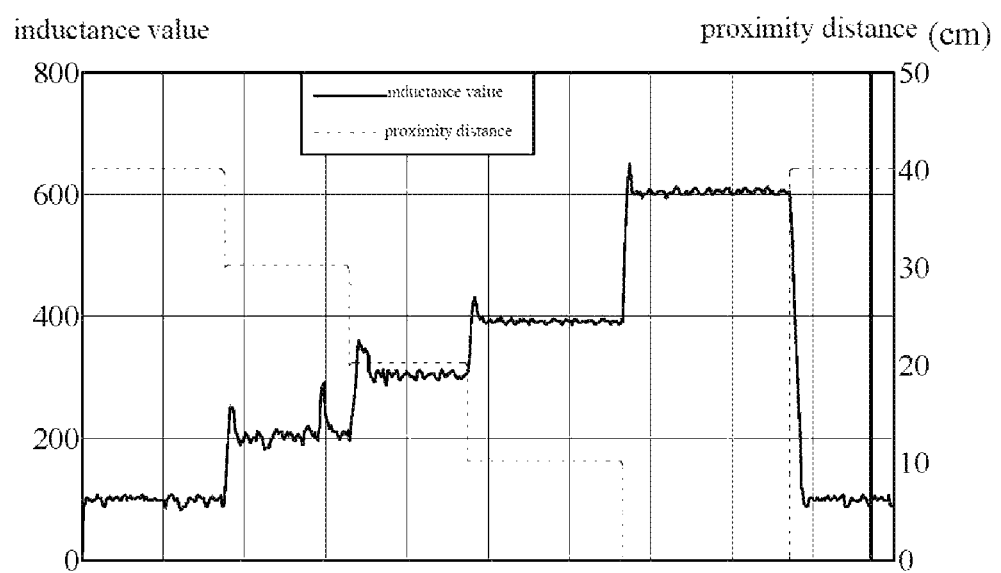
FIG. 9 is a schematic diagram showing a relationship between an inductance value and a proximity distance according to an embodiment.

FIG. 9 is a schematic diagram showing a relationship between an inductance value and the proximity distance according to an embodiment. Please refer to FIG. 5 to FIG. 9, when the proximity distance becomes smaller (that is, the human body moves towards the antenna 16 or 16'), the inductance value of the capacitive inductor 18 becomes larger. Therefore, the processor 14 reduces the output power of the wireless radio frequency module 20 to conform to the SAR safety specification and have less affection on the human body. When the proximity distance becomes larger (that is, the human body moves away from the antenna 16 or 16'), the inductance value of the capacitive inductor 18 becomes smaller. At this time, the processor 14 increases the output power of the wireless radio frequency module 20 to have a good connection effect. In an embodiment, when the proximity distance between the human body and the electronic device 10 is changed from 40 cm to 0 cm gradually, there are four inductance value ranges is formed. The processor 14 transmits the power setting parameters corresponding to the four inductance value ranges to the wireless radio frequency module 20 in sequence, and the wireless radio frequency module 20 reduces the output power according to the power setting parameters. Therefore, the output power has four ranges in sequence correspondingly. As a result, the wireless radio frequency module 20 has different output power when the distance between the human body and the antennas 16 and 16' are different. Consequently, the output power is dynamically adjusted.

Figure 10A:
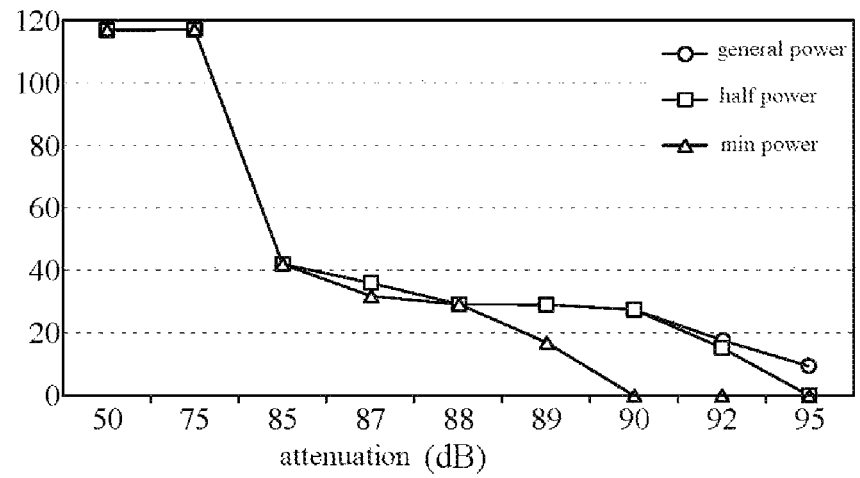
FIG. 10a is a schematic diagram showing a result of a receiving terminal at different test distances with different output power when a wireless radio frequency module operates at a 2.4G operating band.
Figure 10B:
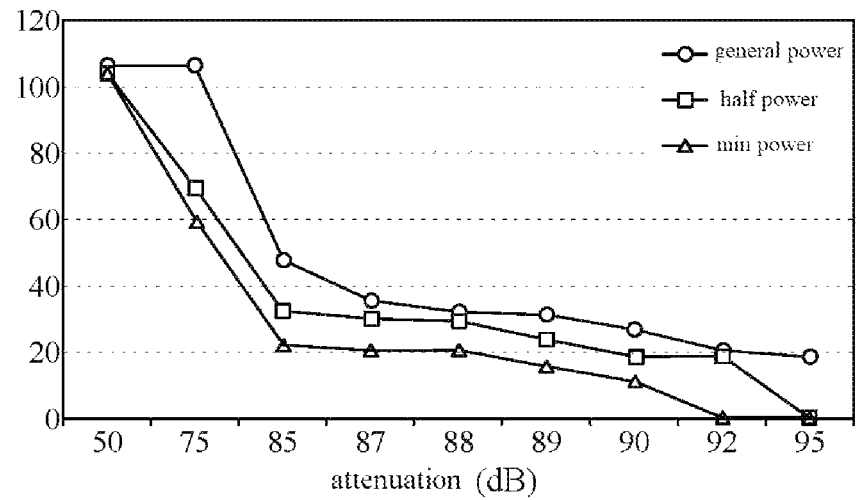
FIG. 10b is a schematic diagram showing a result of a transmitting terminal at different test distances with different output power when a wireless radio frequency module operates at a 2.4G operating band.
Figure 11A:
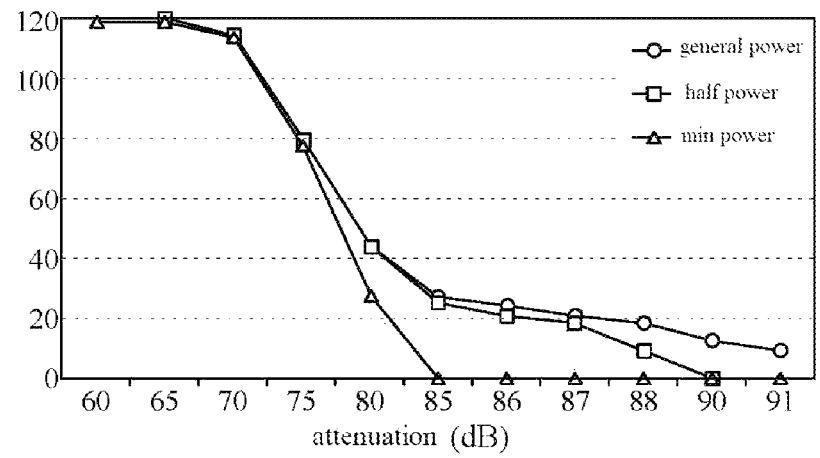
FIG. 11a is a schematic diagram showing a result of a receiving terminal at different test distances with different output power when a wireless radio frequency module operates at a 5G operating band.
Figure 11B:
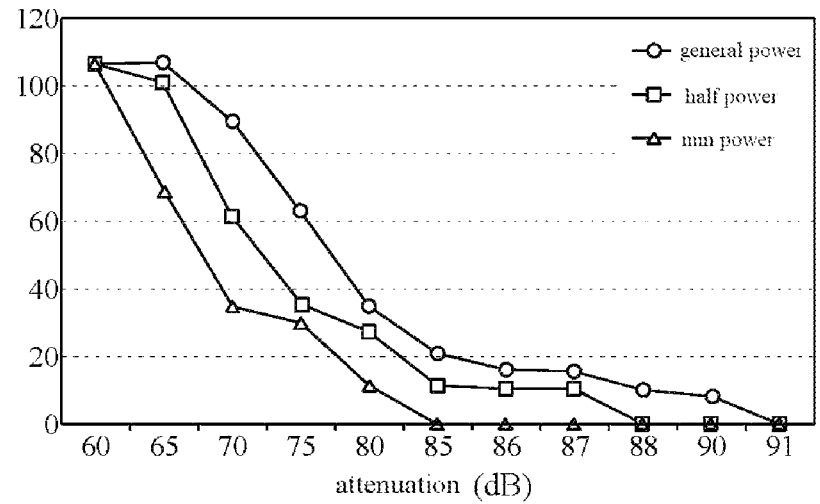
FIG. 11b is a schematic diagram showing a result of a transmitting terminal at different test distances with different output power when a wireless radio frequency module operates at a 5G operating band.

FIG. 10a and FIG. 10b are schematic diagrams showing results of a receiving terminal and a transmitting terminal at different test distances with different output power when a wireless radio frequency module operates at a 2.4G operating band. FIG. 11a and FIG. 11b are schematic diagrams showing results of a receiving terminal and a transmitting terminal at different test distances with different output power when a wireless radio frequency module operates at a 5G operating band. As shown in FIG. 10a, FIG. 10b, FIG. 11a, and FIG. 11b, the receiving speed has a big difference when the receiving terminal (Rx) is at a long distance. The transmitting speed has a big difference when the transmitting terminal (Tx) at a short distance. No matter at the 2.4G or 5G operating band, when the output power is reduced from a general power to a half power, or even to a low power, the connection performance of the wireless radio frequency module becomes poor. As a result, since the output power is dynamically adjusted, the connection performance of the wireless radio frequency module is better. Moreover, users have a better user experience.

In sum, with a sensor and an antenna in this disclosure, the output power of the wireless radio frequency module is dynamically adjusted to improve the network performance.

Although the present invention has been described in considerable detail with reference to certain preferred embodiments thereof, the disclosure is not for limiting the scope of the invention. Persons having ordinary skill in the art may make various modifications and changes without departing from the scope. Therefore, the scope of the appended claims should not be limited to the description of the preferred embodiments described above.

What is claimed is:

1. An electronic device, comprising:
   an antenna;
   a system circuit board;
   a conducting circuit, disposed on the system circuit board and electrically connected to the antenna;
   a sensor disposed on the system circuit board and electrically connected to the conducting circuit;
   a wireless radio frequency module disposed on the system circuit board and connected to the antenna via the conducting circuit; and
   a processor disposed on the system circuit board and electrically connected to the sensor and the wireless radio frequency module,
   wherein the sensor generates and transmits a sensing signal to the processor according to a change of a proximity distance between an object and the antenna, the processor dynamically adjusts output power of the wireless radio frequency module according to a sensing signal;
   wherein the processor outputs a power setting parameter to the wireless radio frequency module according to a sensing signal and an induction comparison table, and the processor dynamically adjusts the output power of the wireless radio frequency module according to the power setting parameter; and
   wherein the sensing signal is an inductance value, the induction comparison table at least includes two inductance value ranges and the power setting parameters corresponding to the two inductance value ranges.

2. The electronic device according to claim 1, wherein the sensor is a capacitive inductor, the capacitive inductor is electrically connected to the antenna via a capacitor element, and the capacitive inductor generates the sensing signal according to a change of a capacitance of the capacitor element.

3. The electronic device according to claim 1, wherein when the proximity distance becomes shorter, the inductance value becomes larger, and the output power is adjusted smaller; when the proximity distance becomes larger, the inductance value becomes smaller, and the output power is adjusted larger.

4. The electronic device according to claim 1, wherein the antenna is electrically connected to the conducting circuit via a coaxial cable.

5. The electronic device according to claim 1, wherein the wireless radio frequency module is electrically connected to the conducting circuit via a coaxial cable.

6. The electronic device according to claim 1, wherein the electronic device further includes a casing to accommodate the system circuit board, and the antenna is disposed at an inner surface of a side of the casing.

7. An antenna system, electrically connected to a processor, the antenna system comprising:
    an antenna;
    a sensor, electrically connected to the antenna, the sensor is electrically connected to the processor; and
    a wireless radio frequency module electrically connected to the antenna and the processor;
    wherein the sensor generates and transmits a sensing signal to the processor according to a change of a proximity distance between an object and the antenna, the processor dynamically adjusts an output power of the wireless radio frequency module according to a sensing signal;
    wherein the sensing signal is an inductance value, the proximity distance becomes shorter, the inductance value becomes larger, and the output power is adjusted smaller; when the proximity distance becomes larger, the inductance value becomes smaller, and the output power is adjusted larger;
    wherein the processor outputs a power setting parameter to the wireless radio frequency module according to a sensing signal and an induction comparison table, and the processor dynamically adjusts the output power of the wireless radio frequency module according to the power setting parameter.

8. The antenna system according to claim 7, wherein the sensor is a capacitive inductor, the capacitive inductor is electrically connected to the antenna via a capacitor element, and the capacitive inductor generates the sensing signal according to a change of a capacitance of the capacitor element.

9. The antenna system according to claim 7, wherein the induction comparison table at least includes two inductance value ranges and the power setting parameters corresponding to the two inductance value ranges.

10. The antenna system according to claim 7, wherein the processor is disposed on a system circuit board, and the sensor and the wireless radio frequency module are disposed on the system circuit board.

* * * * *